United States Patent [19] [11] 3,816,373
Hoogeboom [45] June 11, 1974

[54] BRANCHED AROMATIC POLYCARBONATE COMPOSITION

[75] Inventor: Thomas J. Hoogeboom, Evansville, Ind.

[73] Assignee: General Electric Company, Pittsfield, Mass.

[22] Filed: Nov. 1, 1971

[21] Appl. No.: 194,508

[52] U.S. Cl.............. 260/47 XA, 260/463, 260/860, 260/49
[51] Int. Cl.............................................. C08g 17/13
[58] Field of Search ............................... 260/47 XA

[56] References Cited
UNITED STATES PATENTS

| | | |
|---|---|---|
| 2,950,266 | 8/1960 | Goldblum ........................... 260/47 |
| 3,094,508 | 6/1963 | Butterworth et al................. 260/47 |
| 3,291,774 | 12/1966 | Bolgiano............................. 260/47 |
| 3,525,712 | 8/1970 | Kramer................................ 260/47 |
| 3,544,514 | 12/1970 | Schnell et al. ...................... 260/47 |

Primary Examiner—Wilbert J. Briggs, Sr.
Attorney, Agent, or Firm—William P. Mufatte

[57] ABSTRACT

An intermediate composition consisting of the reaction product of at least 3 moles of a dihydric phenol with 1 mole of a trifunctional compound having as its functionality hydroxyl or carboxyl groups. The intermediate is reacted with a dihydric phenol and phosgene to prepare a haze-free branched polycarbonate polymer having non-Newtonian flow characteristics.

2 Claims, No Drawings

BRANCHED AROMATIC POLYCARBONATE COMPOSITION

This invention relates to a novel intermediate composition having usefulness in further reacting with dihydric phenol to prepare a particular polycarbonate which has excellent blow molding properties.

Specifically, the intermediate is the reaction product of a dihydric phenol and a trifunctional compound which intermediate is then reacted with a dihydric phenol to produce a branched polycarbonate.

BACKGROUND OF THE INVENTION

Polycarbonates of the bisphenol-A (2,2-bis(4-hydroxyphenyl)propane) type are an exception to most thermoplastic polymers in the melt rheology behavior. Most thermoplastic polymers exhibit non-Newtonian flow characteristics over essentially all melt processing conditions. Newtonian flow is defined as the type of flow occurring in a liquid system where the rate of shear is directly proportional to the shearing force. Non Newtonian flow is observed when the rate of shear is not directly proportional to the shearing force. Bisphenol-A polycarbonate exhibits Newtonian flow.

Two other characteristics of molten thermoplastic polymers are significant for molding and these are melt elasticity and melt strength. Melt elasticity is the recovery of the elastic energy stored within the melt because of distortion or orientation of the molecules by shearing stresses. Melt strength may be simply described as the tenacity of a molten strand and is really the ability of the melt to support a stress.

Both of these are important in extrusion particularly to fabrication by blow molding. Non-Newtonian flow characteristics tend to impart melt elasticity and melt strength to such polymers allowing the use thereof in blow molding fabrication. In the usual blow molding operation, a hollow tube of molten thermoplastic is extruded vertically downward at a temperature of about 200°–400° C. A mold then surrounds the tube and air introduced into the tube forces it to conform to the shape of the mold. The length of the tube and the quantity of material comprising the tube are limiting factors in determining the ultimate size and wall thickness of the molded part. The fluidity of the melt obtained from bisphenol-A polycarbonate, or the lack of melt strength and also the paucity of extrudate swelling, serve to limit blow molding applications to relatively small, thin walled parts. Temperatures must also be extremely carefully controlled to prevent the desired length of extruded tube from falling away before the mold can close around it for blowing. Consequently, it will be appreciated that the Newtonian behavior of polycarbonate resin melts has served to restrict severely their use in the production of large hollow bodies by conventional blow-molding operations as well as in the production of various shapes by profile extrusion methods.

DESCRIPTION OF THE INVENTION

It has been discovered that by reacting a trifunctional compound with a dihydric phenol, a branched polycarbonate is obtained having the property of non-Newtonian flow, melt elasticity and melt strength. However, it has been difficult to obtain sufficient reaction between the dihydric phenol and trifunctional compound. The direct reaction thereof with phosgene to produce the polycarbonate, actually copolyester carbonate, produces a hazy polycarbonate.

It has also been discovered that by first making a concentrate or intermediate, the intermediate provides fast, efficient and significantly large amounts of the trifunctional compound to react into the polymer chain. Previously less than 30% of the trifunctional compound could be incorporated into the polymer which necessitated starting with substantially large quantities of the trifunctional compound. This required removal of the excess compound to avoid contamination. When employing the concentrate of this invention, as much as 100 percent of the trifunctional compound can now be incorporated into the polymer.

More specifically, a concentrate or intermediate is formed by reacting a dihydric phenol such as 2,2-bis(4-hydroxy-phenyl) propane (bisphenol-A) with a trifunctional compound such as 4,4-bis(4'hydroxyphenyl) pentanoic acid and a carbonate precursor such as phosgene. The reaction requires reacting at least 3 moles of bisphenol-A per mole of the trifunctional compound. The resulting intermediate is a trifunctional compound end-capped with bisphenol-A. The intermediate may be represented by the following formula:

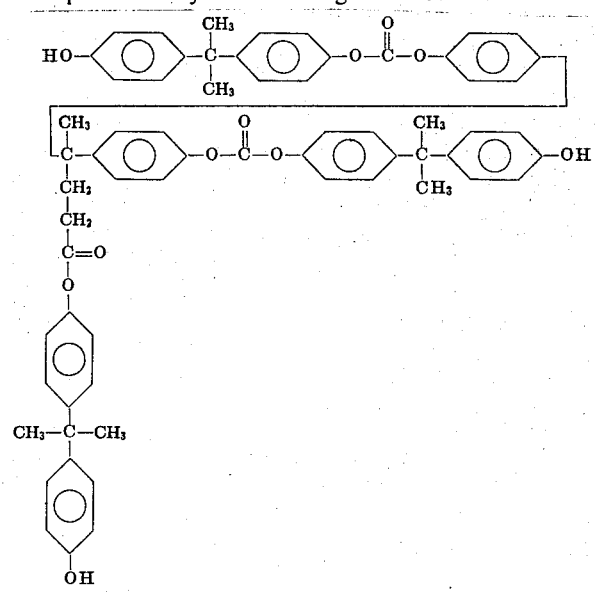

While the above formula represents what is believed to be the predominant reaction product, the product can also contain minor amounts of bisphenol-A homopolymer and minor amounts of material as represented by the following formula wherein BPA represents:

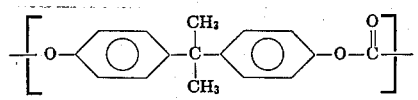

and PA represents:

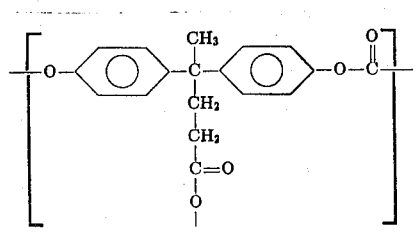

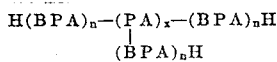
and
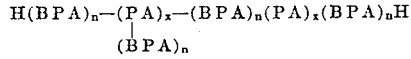

wherein $n$ is an integer of 1–4 and $x$ is an integer of 1–3.

While the above is believed to be the resulting reaction product, it is not intended that the above formulae be binding upon applicant. The intermediate compound can best be described as the reaction product of at least 3 moles of a dihydric phenol such as bisphenol-A per mole of a trifunctional compound such as 4,4-bis(4'hydroxyphenyl) pentanoic acid and a carbonate precursor such as phosgene.

The resulting intermediate compound is then reacted with a dihydric phenol and a carbonate precursor to produce a randomly branched polycarbonate. The proportions of the intermediate employed are such as to provide in the polymer 0.2 – 5.0 weight percent of the residue of the trifunctional compound based on the weight of the resulting polymer.

The polymer is prepared by carrying out the reaction of the intermediate compound, dihydric phenol and carbonate precursor to produce the copolyester carbonate in the presence of an organic solvent for the copolyester carbonate as formed and an inorganic acid acceptor. More specifically, the reaction involves passing the carbonate precursor such as phosgene into a slurry comprising a suspension of the dihydric phenol, the intermediate compound and an inorganic acid acceptor such as calcium hydroxide in an organic liquid phase such a methylene chloride but which is a solvent for the polymer when formed.

The polymer so formed when in the molten state exhibits non-Newtonian flow characteristics, excellent melt elasticity and a high melt strength. The polymer thus has excellent application in blow molding fabrication. Another application area is in the vacuum forming fabrication of sheet. The sheet is supported in clamps and heated to forming temperatures whereupon it is brought into contact with a mold and vacuum drawn to force the sheet to conform to the mold. The melt elasticity of the polycarbonate and melt strength provides a distinct advantage in the use of the copolyester carbonate over bisphenol-A homopolymer.

DESCRIPTION OF THE PREFERRED EMBODIMENT

The examples set forth herein are to illustrate in more detail the preferred embodiment and to illustrate more clearly the principal and practice of this invention to those skilled in the art. Where percentages or parts are mentioned, they are on a weight basis.

EXAMPLE I

To a reactor, charge 122 lbs. of bisphenol-A, 65 gals. of methylene chloride and 45 gals. of water. Phosgene is then bubbled into the reactor at a rate of 40 lbs./hr. for 90 minutes. The pH of the reaction is maintained at 5.5 – 6.0 with sodium hydroxide solution. At this point, 49.6 lbs. of 4,4-bis (4'hydroxyphenyl) pentanoic acid and 556 ml. of triethylamine are added to the reactor. The pH is raised to 8.0 – 8.2 and phosgene is continued at the rate of 40 lbs./hr. for an addition 15 minutes.

The organic phase is separated, worked with HCl and then with water. The solution is found to contain 8.6 weight percent of the pentanoic acid by first drying a sample to powder form, hydrolyzing with methanol and sodium hydroxide solution. Bisphenol-A is separated from the pentanoic acid by extraction with ether at pH 8–9. The pentanoic acid content is determined by measuring the absorbance at 293 nanometers and reading the concentration from a standard calibration curve. This constitutes an incorporation of only 29.6 percent of the theoretical amount capable of being incorporated into the reaction.

EXAMPLE II

To a reactor, charge 100 gallons of the solution prepared in Example I, 3,000 lbs. of bisphenol-A, 60 lbs. of para-tertiary butyl phenol, 3,000 lbs. of lime, 24,000 lbs. of methylene chloride and 500 ml. of triethylamine. Phosgene is then bubbled into the reaction mixture at a rate of 2,000 lbs./hr. for 30 minutes. The brine is agglomerated and the organic phase containing the resin is separated from the solid brine and calcium chloride. The solution is turbid and attempts to clarify it by filtration resulted in the clogging or blinding of the filters and very difficult to process. The solvent is evaporated leaving a product containing 0.46 weight percent of pentanoic acid.

EXAMPLE III

Example I is repeated except that the 4,4-bis(4'hydroxyphenyl) pentanoic acid and triethylamine are charged to the reactor with the bisphenol-A, methylene chloride and water. Phosgene is then added as in Example I including the pH conditions.

The organic phase is separated, worked with HCl and then with water, and the pentanoic acid content determined as described in Example I and found to contain 20.0 weight percent of the pentanoic acid. This constitutes incorporation of 66 percent of the theoretical amount capable of being incorporated into the product.

EXAMPLE IV

Example II is repeated except that 55 gals. of the solution prepared in Example III are employed herein instead of the solution prepared in Example I. The organic phase after separation as in Example II is clear. The solution is evaporated and the resin obtained is found to have 0.46 weight percent of pentanoic acid.

As shown in the Examples, by merely reacting the trifunctional compound at the beginning with the bisphenol-A, a greater amount of the trifunctional compound is incorporated into the intermediate compound. When the intermediate compound is then reacted with a dihydric phenol and a carbonate presursor, a copolyester carbonate is obtained which is free of haze and which has excellent properties for blow molding and vacuum forming applications.

When preparing the intermediate compound by the process of Example I, considerably less of the trifunctional compound can be incorporated into the intermediate compound and when employed to prepare a copolyester carbonate, the resulting polymer is hazy.

As stated previously, the copolyester carbonate of this invention is prepared by reacting an intermediate compound with a dihydric phenol and a carbonate precursor. The intermediate compound is as described above and consists of the reaction product of a trifunctional compound, a dihydric phenol and a carbonate precursor.

The trifunctional compounds which are employed in the examples in place of the pentanoic acid with essentially the same results are 2,2-bis(4'-hydroxyphenyl)acetic acid, 3,3-bis (4'-hydroxyphenyl) propanoic acid, 2,2-bis(4'-hydroxyphenyl) propanoic acid, 1,1-bis(4-hydroxyphenyl) cyclohexane-2 carboxylic acid, 1,1-bis(4-hydroxyphenyl) cyclohexane-3 carboxylic acid and 1,1-bis(4-hydroxyphenyl) cyclohexane-4 carboxylic acid.

The dihydric phenols that can be employed herein to prepare the copolyester carbonate of this invention are bisphenols such as bis(4-hydroxyphenyl) methane, 2,2-bis(4-hydroxyphenyl) propane, 2,2-bis(4-hydroxy-3-methylphenyl) propane, 4,4-bis(4-hydroxyphenol) heptane, 2,2-bis(4-hydroxy 3,5-dichlorophenyl) propane, 2,2-bis(4-hydroxy 3,5-dibromophenyl) propane, etc., dihydric phenol ethers such as bis(4-hydroxyphenyl) ether, bis(3,5-dichloro-4-hydroxyphenyl) ether, etc., dihydroxydiphenols such as p,p'-dihydroxyphenyl, 3,3'-dichloro-4,4'-dihydroxydiphenyl, etc. dihydroxyaryl sulfones such as bis(4-hydroxyphenyl) sulfone, bis(3,5-dimethyl-4-hydroxyphenyl) sulfone, etc., dihydroxy benzenes, resorcinol, hydroquinone, halo- and alkyl-substituted dihydroxy benzenes such as 1,4-dihydroxy-2-chlorobenzene, 1,4-dihydroxy-2,5-dichlorobenzene, 1,4-dihydroxy-3-methylbenzene, etc., and dihydroxy diphenyl sulfoxides such as bis(4-hydroxyphenyl) sulfoxide, bis(3,5-dibromo-4-hydroxyphenyl) sulfoxide, etc. A variety of additional dihydric phenols are also available to provide carbonate polymers and are disclosed in U.S. Pat. Nos. 2,999,835, 3,028,365 and 3,153,008. It is of course possible to employ two or more different dihydric phenols or a copolymer of a dihydric phenol with glycol or with hydroxy or acid terminated polyester, or with a dibasic acid in the event a carbonate copolymer of interpolymer rather than a homopolymer is desired for use in the preparation of the aromatic carbonate polymers of this invention.

The carbonate precursors employed in the practice of this invention can be either a carbonyl halide or a bishaloformate. The carbonyl halides which can be employed herein are carbonyl chloride, carbonyl bromide and mixtures thereof. The bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

As stated previously, the reaction may be carried out in the presence of an acid acceptor which may be either an organic or an inorganic compound. A suitable organic acid acceptor is a tertiary amine and includes such materials as pyridine, triethylamine, dimethylaniline, tributylamine, etc. The inorganic acid acceptor may be one which can either be an hydroxide, a carbonate, a bicarbonate or a phosphate of an alkali or alkaline earth metal.

The molecular weight regulators which are also employed in carrying out the process for preparing the aromatic polycarbonate resins can be such molecular weight regulators as phenol, cyclohexanol, methanol, para-tertiarybutylphenol, para-bromophenol, etc. Preferably, para-tertiarybutylphenol is employed as the molecular weight regulator.

It will thus be seen that the objects set forth above among those made apparent from the preceding description are efficiently attained, and since certain changes may be made in carrying out the above process and in the composition set forth without departing from the scope of this invention, it is intended that all matters contained in the above description shall be interpreted as illustrative and not in a limiting sense.

What is claimed is:

1. A process for preparing a polycarbonate resin that is haze-free and having excellent blow molding properties which process consists of reacting 2–5 moles of an intermediate composition with 6–5 moles of a dihydric phenol and 1 mole of a carbonate precursor in the presence of a catalyst, an acid acceptor in an aqueous solution and an inert organic solvent for the polymer as formed; said intermediate composition consisting of the reaction product of at least 3 moles of a dihydric phenol with one mole of a trifunctional compound and a carbonate precursor, wherein the trifunctional compound has a functionality selected from the group consisting of hydroxyl, carboxyl or mixtures thereof.

2. The process of claim 1 wherein the dihydric phenol is 2,2-bis(4-hydroxyphenyl) propane.

* * * * *